United States Patent
Kawamura et al.

(10) Patent No.: US 9,509,499 B2
(45) Date of Patent: *Nov. 29, 2016

(54) ELECTRONIC KEY REGISTRATION METHOD AND ELECTRONIC KEY REGISTRATION SYSTEM

(71) Applicant: KABUSHIKI KAISHA TOKAI RIKA DENKI SEISAKUSHO, Aichi (JP)

(72) Inventors: Daisuke Kawamura, Aichi (JP); Hideki Kawai, Aichi (JP); Tetsuya Egawa, Aichi (JP); Hiroaki Iwashita, Aichi (JP); Toshihiro Nagae, Aichi (JP); Masaki Hayashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 77 days.

This patent is subject to a terminal disclaimer.

(21) Appl. No.: 14/373,240

(22) PCT Filed: Jan. 18, 2013

(86) PCT No.: PCT/JP2013/050914

§ 371 (c)(1),
(2) Date: Jul. 18, 2014

(87) PCT Pub. No.: WO2013/114970

PCT Pub. Date: Aug. 8, 2013

(65) Prior Publication Data

US 2014/0359292 A1    Dec. 4, 2014

(30) Foreign Application Priority Data

Jan. 31, 2012    (JP) .................................. 2012-018439

(51) Int. Cl.
*H04L 9/32* (2006.01)
*H04L 9/08* (2006.01)
(Continued)

(52) U.S. Cl.
CPC ............. *H04L 9/0822* (2013.01); *B60R 25/24* (2013.01); *H04L 9/0866* (2013.01);
(Continued)

(58) Field of Classification Search
CPC ..... H04L 9/08; H04L 9/0822; H04L 9/0866; H04L 9/0869; H04L 9/0897; H04L 2209/84; H04L 2209/24; G07C 9/00; G07C 9/00857; B60R 24/25

USPC ............................................. 713/168; 380/44
See application file for complete search history.

(56) References Cited

U.S. PATENT DOCUMENTS 5,689,564 A * 11/1997 Johnson .................. G06F 21/34
380/277
(Continued)

FOREIGN PATENT DOCUMENTS

CN    1769637 A    5/2006
JP    10-175512    6/1998
(Continued)

OTHER PUBLICATIONS

Extended European Search Report, mailed Oct. 22, 2015 for European Patent Application No. 13743743.0.
(Continued)

*Primary Examiner* — Michael R Vaughan
*Assistant Examiner* — Dereena Cattungal
(74) *Attorney, Agent, or Firm* — Greenblum & Bernstein, P.L.C.

(57) ABSTRACT

A method for registering a first electronic key, which is capable of controlling a communication subject, to a controller of the communication subject, the method including: performing an initial production process including storing identification information unique to the communication subject in the controller, and storing an encryption key generation code unique to the first electronic key and an encryption key that is used to verify the first electronic key in the first electronic key; and performing an initial registration process including writing the identification information stored in the controller to the first electronic key, obtaining the encryption key generation code from the first electronic key, generating the encryption key with an encryption key generation logic that uses the encryption key generation code, storing the encryption key in the controller, and storing encryption key information related to the encryption key in a database in association with the identification information.

6 Claims, 5 Drawing Sheets

(51) Int. Cl.
*B60R 25/24* (2013.01)
*G07C 9/00* (2006.01)

(52) U.S. Cl.
CPC .......... *H04L 9/0869* (2013.01); *H04L 9/0897* (2013.01); *G07C 9/00857* (2013.01); *H04L 2209/24* (2013.01); *H04L 2209/84* (2013.01)

(56) References Cited

U.S. PATENT DOCUMENTS

| | | | | |
|---|---|---|---|---|
| 5,886,421 | A * | 3/1999 | Mizuno | B60R 25/00 180/287 |
| 6,160,488 | A | 12/2000 | Honda | |
| 6,429,773 | B1 | 8/2002 | Schuyler | |
| 6,737,955 | B2 * | 5/2004 | Ghabra | B60R 25/24 307/10.5 |
| 7,227,446 | B2 * | 6/2007 | Kumazaki | B60R 25/24 340/5.6 |
| 7,545,255 | B2 * | 6/2009 | Ohtaki | H04B 13/005 340/5.23 |
| 8,207,817 | B2 * | 6/2012 | Kamiya | G07C 9/00309 340/5.7 |
| 8,237,554 | B2 * | 8/2012 | Miller | B60R 25/24 340/426.13 |
| 8,305,189 | B2 * | 11/2012 | Miller | B60R 25/00 340/5.1 |
| 2004/0078066 | A1 * | 4/2004 | Ohta | G06F 21/10 607/60 |
| 2004/0093523 | A1 * | 5/2004 | Matsuzaki | G06F 21/10 726/10 |
| 2004/0128508 | A1 * | 7/2004 | Wheeler | G06F 21/33 713/170 |
| 2004/0222699 | A1 * | 11/2004 | Bottomley | B60R 25/24 307/9.1 |
| 2005/0099265 | A1 * | 5/2005 | Dix | G06Q 10/02 340/5.72 |
| 2005/0285716 | A1 * | 12/2005 | Denison | G07F 11/002 340/5.2 |
| 2007/0090921 | A1 * | 4/2007 | Fisher | G07C 9/00103 340/5.73 |
| 2008/0150683 | A1 * | 6/2008 | Mikan | G07C 9/00309 340/5.31 |
| 2009/0323967 | A1 * | 12/2009 | Peirce | H04L 9/0869 380/278 |
| 2010/0220857 | A1 | 9/2010 | Kawamura et al. | |
| 2012/0068817 | A1 * | 3/2012 | Fisher | G07C 9/00571 340/5.61 |
| 2013/0187756 | A1 * | 7/2013 | Fisher | G07C 9/00571 340/5.61 |
| 2013/0247117 | A1 * | 9/2013 | Yamada | G08C 17/02 725/93 |
| 2013/0285792 | A1 | 10/2013 | Shimizu et al. | |
| 2013/0301829 | A1 | 11/2013 | Kawamura et al. | |
| 2013/0301834 | A1 | 11/2013 | Kawamura et al. | |
| 2013/0329890 | A1 | 12/2013 | Kawamura et al. | |
| 2013/0332736 | A1 | 12/2013 | Kawamura et al. | |
| 2014/0037092 | A1 * | 2/2014 | Bhattacharya | G07C 9/00174 380/259 |
| 2014/0098958 | A1 | 4/2014 | Kawamura et al. | |
| 2014/0098959 | A1 | 4/2014 | Kawamura et al. | |
| 2014/0126719 | A1 | 5/2014 | Kawamura et al. | |
| 2014/0232520 | A1 | 8/2014 | Kawamura et al. | |
| 2014/0232521 | A1 | 8/2014 | Kawamura et al. | |
| 2015/0113280 | A1 * | 4/2015 | Maruyama | H04L 9/0822 713/171 |
| 2015/0263860 | A1 * | 9/2015 | Leboeuf | H04L 9/3226 713/171 |

FOREIGN PATENT DOCUMENTS

| | | |
|---|---|---|
| JP | 2001-301572 | 10/2001 |
| JP | 2001-323704 | 11/2001 |
| JP | 2009-030312 | 2/2009 |
| JP | 2009-271936 | 11/2009 |
| JP | 2009-302848 | 12/2009 |
| JP | 2010-206383 | 9/2010 |
| WO | 03/002385 | 1/2003 |

OTHER PUBLICATIONS

Japanese Office Action, mailed Sep. 1, 2015 for Japanese Patent Application No. 2012-018439, along with English translation.
U.S. Appl. No. 14/374,126 to Hiroaki Iwashita et al., filed Jul. 23, 2014.
U.S. Appl. No. 14/373,146 to Daisuke Kawamura et al., filed Jul. 18, 2014.
International Search Report in PCT/JP2013/050914, mailed Mar. 5, 2013.
English language translation of International Preliminary Report on Patentability in PCT/JP2013/050914, mailed Aug. 5, 2014.
Office Action in the Chinese Patent Application No. 201380007142.4, dated Jun. 12, 2016.

* cited by examiner

Fig.1

Fig.2
<Initial Production Step>

Fig.3
<Initial Registration Step>

Fig.5
<Additional Key Production Step>

Fig.6
<Replacement ECU Production Step>

Fig.7
<Replacement ECU Registration Step>

ELECTRONIC KEY REGISTRATION METHOD AND ELECTRONIC KEY REGISTRATION SYSTEM

TECHNICAL FIELD

The present invention relates to an electronic key registration method and an electronic key registration system that register an electronic key to a controller of a communication subject.

BACKGROUND ART

Conventionally, a known electronic key system performs radio communication between an electronic key, which a user of a vehicle carries, and the vehicle and performs the locking or unlocking of a vehicle door and the starting or stopping of the engine when verification of the electronic key is successful. In such electronic key systems, communication between the electronic key and the vehicle needs to be protected in order to ensure security. Thus, in the electronic key system, encrypted communication is performed between the electronic key and the vehicle (for example, refer to patent document 1). In the encrypted communication, contents of communication are encrypted to ensure high confidentiality.

As the above encrypted communication, the common key cryptosystem is employed. The common key cryptosystem uses the same encryption key for encryption and decryption. Thus, the electronic key and the vehicle need to have the same encryption key. The encryption key is registered to the electronic key and the vehicle when registering the electronic key to a controller of the vehicle. The controller authenticates the electronic key by verifying identification information that is transmitted through radio communication from the electronic key with identification information that is stored in the controller.

PRIOR ART DOCUMENT

Patent Document 1: Japanese Laid-Open Patent Publication No. 2009-302848

SUMMARY OF THE INVENTION

In an electronic key registration system that registers an electronic key to a controller, unless the controller is associated with the corresponding electronic key, any electronic key may be registered to the controller. This would allow for an electronic key other than the authentic electronic key to be registered to the controller. The inventors of the present application have considered shipping the controller and the electronic key from the factory after storing a vehicle ID in the controller and the electronic key. The vehicle ID is identification information unique to the vehicle (communication subject), to which the electronic key is registered. However, when the vehicle ID is tampered with, the controller would determine that an unauthentic electronic key is the authentic electronic key. Although the controller and the electronic key could be shipped together, this is complicated and inhibits additional registration of the electronic key at a later date. This problem is not limited to electronic key systems used for vehicles. An electronic key system for use with a building such as a house has the same problem. Therefore, there is a need for an electronic key system that allows for easy registration of an electronic key while ensuring security.

Accordingly, it is an object of the present invention to provide an electronic key registration method and an electronic key registration system that allow for easy registration of an electronic key while ensuring security.

The first aspect is an electronic key registration method that registers a first electronic key, which is capable of controlling a communication subject, to a controller of the communication subject. The method includes an initial production step of storing identification information unique to the communication subject in the controller and storing an encryption key generation code unique to the first electronic key and an encryption key that is used to verify the first electronic key in the first electronic key, and an initial registration step of writing the identification information stored in the controller to the first electronic key, obtaining the encryption key generation code from the first electronic key, generating the encryption key with an encryption key generation logic that uses the encryption key generation code, storing the encryption key in the controller, and storing encryption key information related to the encryption key in a database in association with the identification information.

Regarding the first aspect, in the initial registration step, the controller stores the identification information unique to the communication subject but does not store the encryption key. The first electronic key, which is used for the initial registration, stores the encryption key generation code and the encryption key but does not store the identification information. That is, the data stored in the first electronic key differs from that stored in the controller. Thus, the first electronic key and the controller may be separately shipped from the factory. In the initial registration step, the identification is stored in the first electronic key from the controller. The encryption key generation code is obtained from the first electronic key, the encryption key is generated with the encryption key generation logic, which uses the encryption key generation code, and the encryption key is stored in the controller. Therefore, the electronic key corresponds only to the immobilizer ECU, to which the identification information and the encryption key are registered, and does not correspond to a controller of another vehicle. Subsequent to the initial registration, the encryption key information related to the encryption key is stored in the database from the controller. When producing the replacement controller, the encryption key information may be extracted from the database to store the encryption key in the controller. This allows for easy registration of the encryption key. Consequently, this restricts registration of the initial registration electronic key to a controller of another communication subject. This allows for easy registration of the electronic key while ensuring security and eliminating the need for shipment of the electronic key and the controller together.

In the second aspect, in the electronic key registration method, the initial registration step includes deleting the encryption key generation code, which has been stored in the first electronic key, after storing the encryption key of the first electronic key in the controller.

Regarding the second aspect, in the initial registration step, the encryption key generation code is deleted from the first electronic key, after the first electronic key is initially registered. Therefore, the encryption key would not be generated even when an attempt is made to register the electronic key, which has been initially registered, to the controller of another communication subject. This restricts registration of the initial registration electronic key to the controller of another communication subject.

In the third aspect, in the electronic key registration method, the initial production step includes storing, in the controller, an encryption key that is used to verify a second electronic key that is additionally registered. The electronic key registration method further includes an additional key production step of storing, in the second electronic key, the identification information and the encryption key of the second electronic key, which is stored in the database in association with the identification information.

Regarding the third aspect, the controller can perform verification of the second electronic key without directly obtaining the encryption key from the second electronic key, which is additionally registered. Therefore, this restricts registration of the second electronic key to the controller of another communication subject. This allows for easy registration of the second electronic key while ensuring security.

In the fourth aspect, the electronic key registration method further includes a replacement controller production step of reading the encryption key information from the database and storing the encryption key of the first electronic key and the identification information in a newly replaced controller, and a replacement controller registration step of checking that the identification information, which is stored in the replaced controller, is registered to the first electronic key.

Regarding the fourth aspect, there is no need to exchange the encryption key between the controller and the electronic key. This restricts registration of the electronic key, which does not store the identification information, to the controller.

In the fifth aspect, the electronic key registration method further includes inhibiting the use of the encryption key generation logic after the encryption key generation logic is used.

Regarding the fifth aspect, the use of the encryption key generation logic is inhibited after the first electronic key is initially registered. This inhibits another electronic key, which uses the same encryption key, to be newly registered to the controller.

In the sixth aspect, the electronic key registration method further includes, based on order information generated by checking the identification information that is set in advance for the communication subject, storing identification information, which differs for each communication subject, in the replacement controller and the second electronic key prior to shipment.

Regarding the sixth aspect, the identification information, which differs for each communication subject, is stored in the controller and the second electronic key, which is additionally registered, when shipped from the factory. This inhibits registration of the electronic key to the controller, which differs from the order, and registration of the electronic key, which differs from the order, to the controller after being circulated in the market.

The seventh aspect is an electronic key registration system. The system includes a controller located in a communication subject and an electronic key capable of controlling the communication subject. The controller stores identification information unique to the communication subject. The electronic key stores an encryption key generation code and an encryption key. The controller writes the identification information to the electronic key, obtains the encryption key generation code from the electronic key, calculates the encryption key with an encryption key generation logic that uses the encryption key generation code, and stores encryption key information related to the encryption key in a database in association with the identification information.

The present invention allows for easy registration of the electronic key while ensuring security.

DESCRIPTION OF THE EMBODIMENTS

An electronic key registration system applied to a vehicle according to one embodiment of the present invention will now be described with reference to FIGS. 1 to 8.

Figure 1:
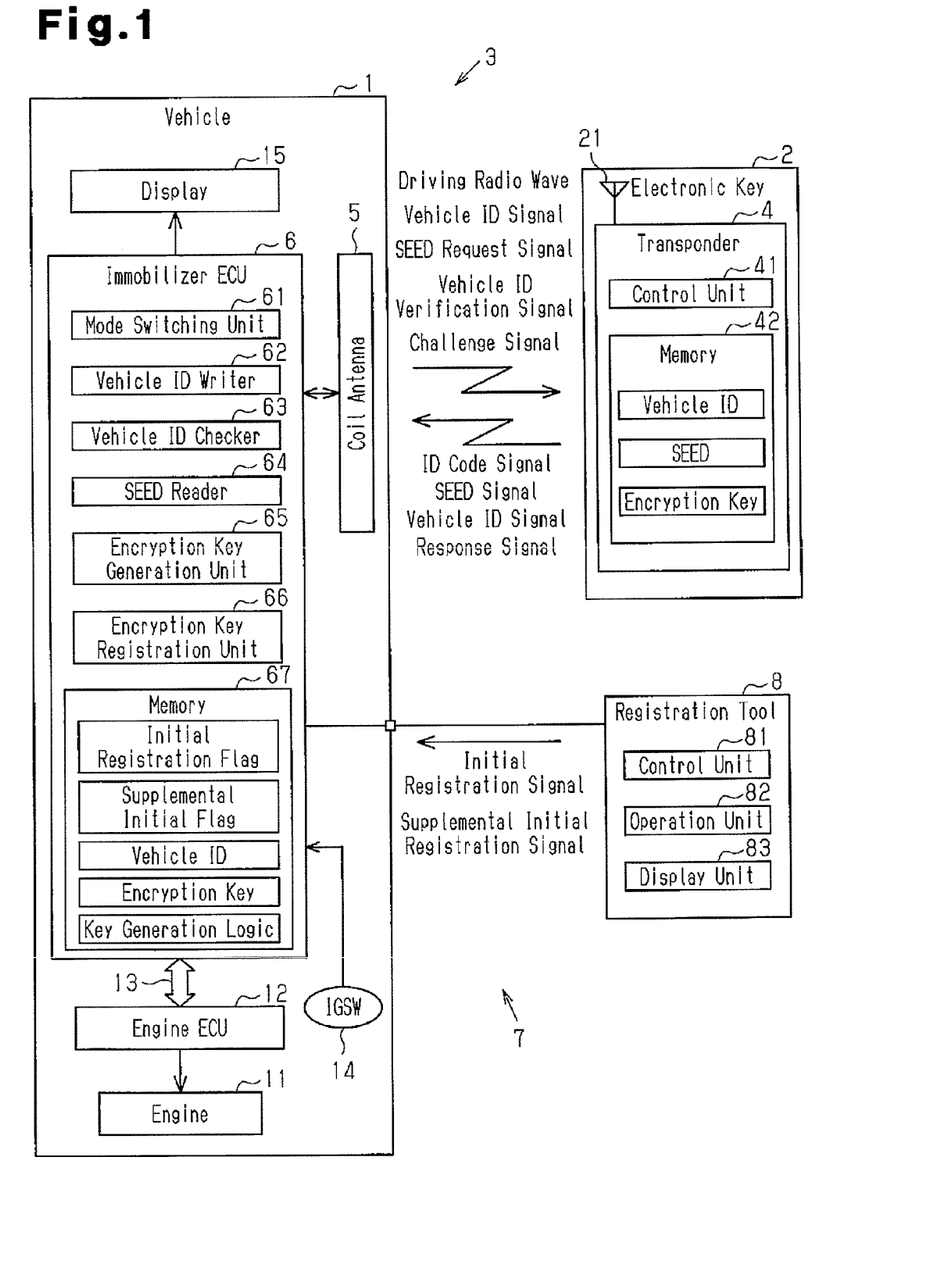
FIG. 1 is a schematic block diagram showing the configuration of an electronic key registration system.

As shown in FIG. 1, a vehicle 1 includes an immobilizer system 3 that performs ID verification with an electronic key 2 through, for example, near field communication (radio communication in which the communication distance is approximately a few centimeters). The electronic key 2 includes an ID tag, which is a so-called transponder 4. In the immobilizer system 3, the transponder 4 is activated with a driving radio wave, which is transmitted from a coil antenna 5 of the vehicle 1. Then, ID verification is performed based on an ID code signal, which is transmitted from the transponder 4. The vehicle 1 is one example of a communication subject. The immobilizer system 3 is one example of an electronic key system.

The vehicle 1 includes an immobilizer ECU 6, which controls the immobilizer system 3. The immobilizer ECU 6 is connected, through an in-vehicle LAN 13, to an engine ECU 12, which controls operations of an engine 11. The immobilizer ECU 6 includes a memory 67, which stores an ID code of the electronic key 2 corresponding to the vehicle 1. In addition, the immobilizer ECU 6 is connected to the coil antenna 5, which receives and transmits radio waves, for example, in the low frequency (LF) bandwidth and radio waves in the high frequency (HF) bandwidth. The coil antenna 5, which is arranged in a key cylinder, is a magnetic field antenna that transmits radio waves with a magnetic-field component. The immobilizer ECU 6 is one example of a controller.

The transponder 4 includes a control unit 41, which controls communication operations of the transponder 4, and a memory 42, which stores an ID code (transponder code) unique to the electronic key 2. The transponder 4 is connected to a receiving-transmitting antenna 21, which receives and transmits radio waves in the LF bandwidth and in the HF bandwidth in the same manner as the coil antenna 5.

In the vehicle 1 of the present embodiment, when starting the engine 11, a user, who enters the vehicle 1, inserts and turns the electronic key 2 in the key cylinder. When detecting the insertion of the electronic key 2 in the key cylinder, the immobilizer ECU 6 intermittently transmits the driving radio wave from the coil antenna 5. Then, the transponder 4 receives, with the receiving-transmitting antenna 21, the driving radio wave, which is transmitted from the coil antenna 5. This activates the transponder 4 using the driving radio wave. When switched to the activation condition, the transponder 4 transmits, from the receiving-transmitting antenna 21, an ID code signal, which includes the ID code stored in the memory 42. The immobilizer ECU 6 receives, with the coil antenna 5, the ID code signal, which is transmitted from the transponder 4, and performs ID verification (immobilizer verification) with the ID code, which is included in the ID code signal. When ID verification is accomplished, the immobilizer ECU 6 holds a flag indicating accomplishment of ID verification in the memory 67.

The key cylinder includes an ignition switch (IGSW) 14, which detects the rotation position of the electronic key 2. For example, when the ignition switch 14 is operated to the engine-starting position, the engine ECU 12 determines whether the immobilizer ECU 6 is holding the flag that indicates accomplishment of ID verification. When determining that ID verification has been accomplished, the engine ECU 12 initiates ignition control and fuel injection control and starts the engine 11.

In the immobilizer verification, the challenge response verification is performed in addition to the code verification, which verifies the ID code of the electronic key 2. In the challenge response verification, the vehicle 1 generates a challenge code, for example, a random number code, and transmits the challenge code to the electronic key 2. The electronic key 2 calculates a response code based on the challenge code and sends the response code back to the vehicle 1. The vehicle 1 also calculates a response code based on the challenge code. Then, the vehicle 1 determines whether or not the response code calculated by the vehicle 1 is the same as the response code received from the electronic key 2. The common key cryptosystem, which uses a common encryption key, is employed for verification between the immobilizer ECU 6 (vehicle 1) and the transponder 4 (electronic key 2). The transponder 4 and the immobilizer ECU 6 each calculate the response code from the challenge code using the common encryption key.

The memory 42 of the transponder 4 stores a vehicle ID (VID) that is identification information unique to the vehicle 1, an encryption key K that is used to verify the electronic key 2, and a SEED code (SC) that is an encryption key generation code unique to the electronic key 2 and used to generate an encryption key K.

The memory 67 of the immobilizer ECU 6 holds an initial registration flag and a supplemental initial flag. The initial registration flag indicates whether or not initial registration of the electronic key 2 to the immobilizer ECU 6 is permitted. The supplemental initial flag indicates whether or not the electronic key 2 is permitted to be initially registered to an immobilizer ECU 6 that has been supplied as a replacement. The memory 67 of the immobilizer ECU 6 stores a vehicle ID (VID) that is identification information unique to the vehicle 1, an encryption key K that is used to verify the electronic key 2, and an encryption key generation logic that is used to generate the encryption key K.

The immobilizer system 3 includes an electronic key registration system 7, which registers the electronic key 2 to the immobilizer ECU 6. The electronic key registration system 7 initially registers the electronic key 2 to the immobilizer ECU 6 and registers the electronic key 2 to the replacement immobilizer ECU 6. The electronic key registration system 7 includes a database 9, which stores one or more encryption keys in association with a single vehicle ID. The encryption key or the SEED code is read from the database 9 and then stored in the immobilizer ECU 6 and the electronic key 2. For example, an encryption key (K-2) associated with a vehicle ID (VID-A), which is unique to the vehicle 1, is stored in the database 9 (refer to FIG. 2).

In the electronic key registration system 7, the encryption key K, which is used to verify the electronic key 2, is stored in the immobilizer ECU 6 to register the electronic key 2 to the immobilizer ECU 6. In this process, the immobilizer ECU 6 does not directly register the encryption key K from the electronic key 2. The immobilizer ECU 6 obtains the SEED code from the electronic key 2 to generate the encryption key K. When storing the encryption key K, the immobilizer ECU 6 also stores the ID code, which is unique to the electronic key 2 and obtained from the electronic key 2.

The electronic key registration system 7 includes a registration tool 8, which is connectable to the vehicle 1. When registering the electronic key 2 to the immobilizer ECU 6, the registration tool 8, which is connected to the vehicle 1, switches operation modes of the immobilizer ECU 6 to a registration mode. The registration tool 8 includes a control unit 81 that controls the registration tool 8, an operation unit 82 that detects a registration operation performed by a user, and a display unit 83 that displays a registration operation. When an initial registration mode is set to register a new electronic key 2, the registration tool 8 transmits, to the vehicle 1, an initial registration signal to change the operation mode of the immobilizer ECU 6 to the initial registration mode. When a supplemental initial registration mode is set to initially register the electronic key 2 to the replacement immobilizer ECU 6, the registration tool 8 transmits, to the vehicle 1, a supplemental initial registration signal, which changes the operation mode of the immobilizer ECU 6 to the supplemental initial registration mode.

The immobilizer ECU 6 includes a mode switching unit 61, which switches operation modes. When receiving the initial registration signal from the registration tool 8, the mode switching unit 61 switches the operation mode to the initial registration mode. When receiving the supplemental initial registration signal from the registration tool 8, the mode switching unit 61 switches the operation mode to the supplemental initial registration mode.

The immobilizer ECU 6 includes a vehicle ID writer 62, which writes a vehicle ID to the electronic key 2 that is initially registered. When the operation mode is switched to the initial registration mode, the vehicle ID writer 62 transmits, from the coil antenna 5 to the electronic key 2, a vehicle ID signal, which includes the vehicle ID stored in the memory 67.

The immobilizer ECU 6 includes a vehicle ID checker 63, which checks whether or not the vehicle ID stored in the electronic key 2 is correct. When the operation mode is switched to the supplemental initial mode, the vehicle ID checker 63 transmits a vehicle ID verification signal from the coil antenna 5 to the electronic key 2. Then, the vehicle ID checker 63 checks whether or not the vehicle ID, which is included in the vehicle ID signal transmitted from the electronic key 2, is the same as the vehicle ID stored in the memory 67.

The immobilizer ECU 6 includes a SEED reader 64 that reads a SEED from the electronic key 2 to generate the encryption key K, which is stored in the electronic key 2. When the operation mode is switched to the initial registration mode or the supplemental initial registration mode, the SEED reader 64 transmits a SEED request signal from the coil antenna 5 to request for the SEED code and extracts the SEED code from a SEED signal, which is transmitted from the electronic key 2.

The immobilizer ECU 6 includes an encryption key generation unit 65, which generates the encryption key K. In the initial registration mode, the encryption key generation unit 65 generates the encryption key K with the key generation logic f, which uses the SEED code obtained from the SEED reader 64.

The immobilizer ECU 6 includes an encryption key registration unit 66, which registers the encryption key K and changes flags. In the initial registration mode, the encryption key registration unit 66 stores, in the memory 67, the encryption key K, which is generated with the encryption key generation unit 65. This completes registration of the encryption key K to the immobilizer ECU 6. After the encryption key K is stored in the initial registration mode, when detecting an initial registration denial operation, the encryption key registration unit 66 inhibits the use of the key generation logic f and denies subsequent initial registration. The initial registration denial operation is, for example, an operation in which the ignition switch 14 is repeatedly switched on and off twenty times. In the same manner, after the encryption key K is stored in the supplemental registration mode, the encryption key registration unit 66 inhibits the use of the key generation logic f and denies subsequent supplemental initial registration.

The electronic key 2 obtains the vehicle ID of the vehicle 1 from the vehicle 1 in advance. For example, when a specific operation that requests for the vehicle ID from the vehicle 1 is performed, the vehicle ID is shown on a display 15. When additionally registering an electronic key 2, the vehicle ID may be shown on the display 15 when the existing electronic key 2 is inserted in the key cylinder and the immobilizer verification is accomplished.

A registration operation of the electronic key 2 to the immobilizer ECU 6 performed by the electronic key registration system 7 will now be described with reference to FIGS. 2 to 8.

Figure 2:
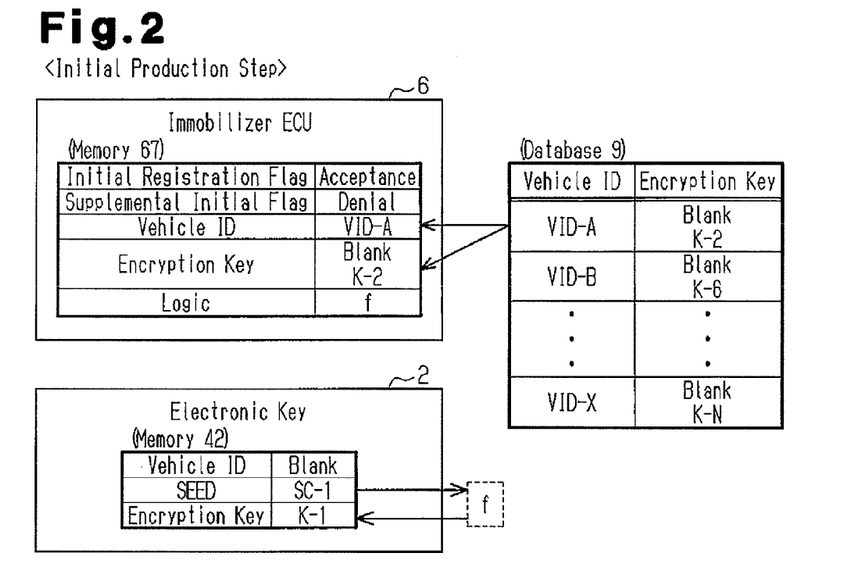
FIG. 2 is a diagram showing the initial production of the electronic key registration system.

As shown in FIG. 2, in an initial production step, the key generation logic f is stored in the memory 67 of the immobilizer ECU 6. Additionally, the vehicle ID (VID-A) of the vehicle 1 and the encryption key (K-2) of the additional registration electronic key 2 from the database 9 are stored in the memory 67. In the memory 67, the initial registration flag is set to an acceptance state, which permits registration of the electronic key 2, and the supplemental initial flag is set to a denial state, which denies registration of the electronic key 2. In the initial production step, the memory 42 of the initial registration electronic key 2 stores the SEED code (SC-1) and the encryption key (K-1) generated with the key generation logic f, which uses the SEED code (SC-1).

Figure 3:
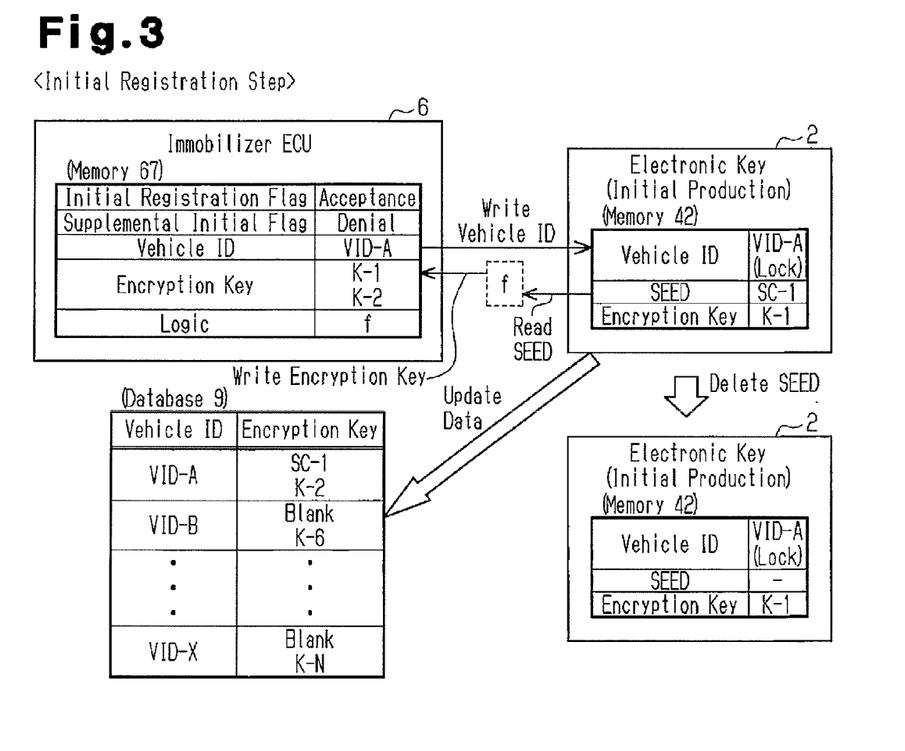
FIG. 3 is a diagram showing the initial registration of the electronic key registration system.

Next, the registration of the electronic key 2 in the factory will be described. When the electronic key 2 is initially registered to the immobilizer ECU 6, the registration tool 8 is connected to the vehicle 1 in an initial registration step.

As shown in FIG. 3, in the initial registration step, the immobilizer ECU 6 writes the vehicle ID (VID-A) to the electronic key 2. Also, the immobilizer ECU 6 reads the SEED code (SC-1) from the electronic key 2, generates the encryption key (K-1) with the key generation logic f, which uses the SEED code (SC-1), and stores the encryption key (K-1) in the memory 67. Then, the immobilizer ECU 6 deletes the SEED code from the memory 42 of the electronic key 2 and stores, in the database 9, the SEED code (SC-1), which serves as encryption key information related to the encryption key (K-1) corresponding to the vehicle ID (VID-A).

Figure 4:
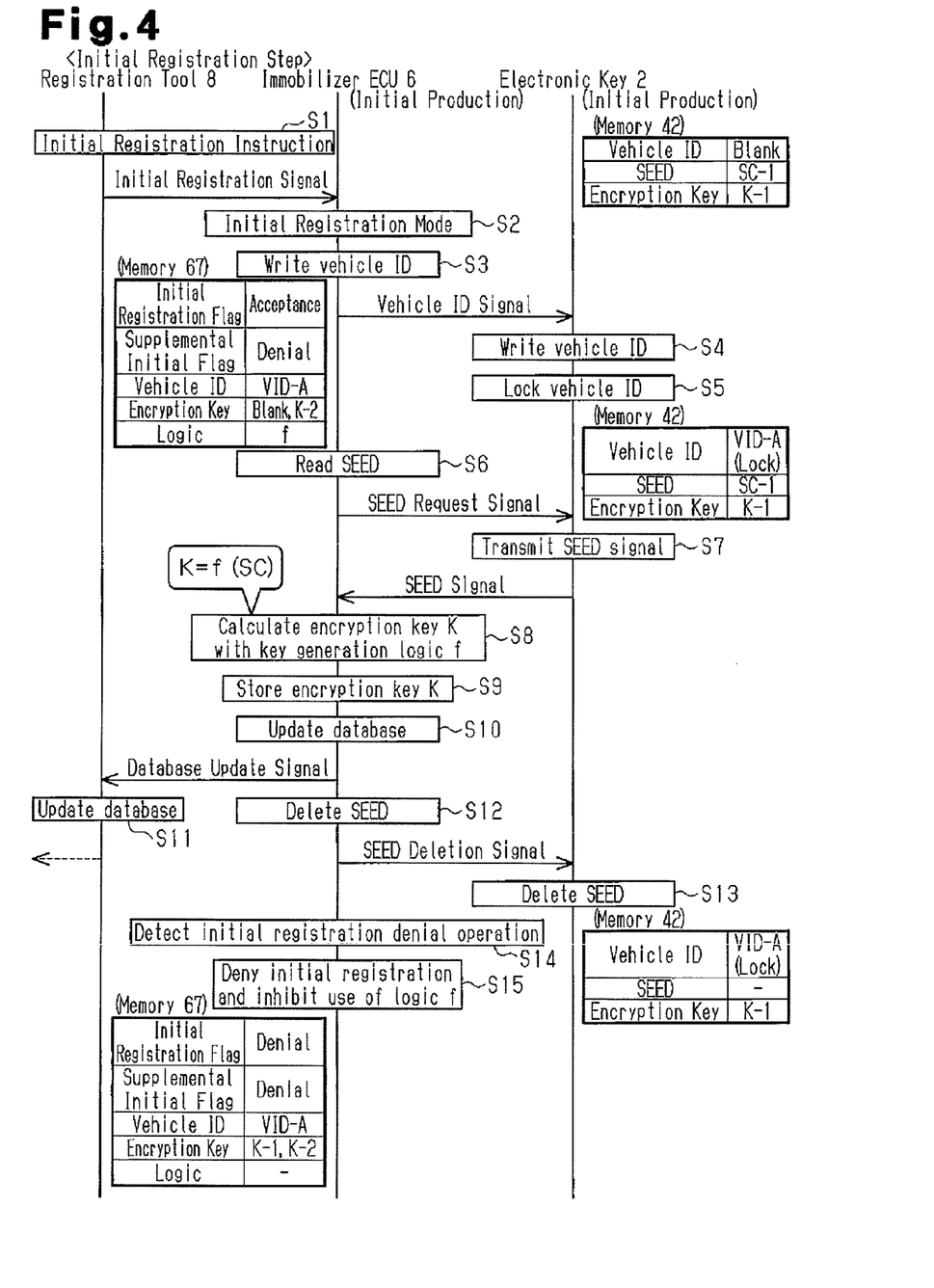
FIG. 4 is a sequence chart showing the registration operation in a factory of the electronic key registration system.

More specifically, as shown in FIG. 4, when a user operates the operation unit 82 to select the initial registration mode, the registration tool 8 transmits, to the immobilizer ECU 6, the initial registration signal, which serves as an initial registration instruction (step S1). When receiving the initial registration signal, the immobilizer ECU 6 switches the operation mode to the initial registration mode (step S2). In the present embodiment, the mode switching unit 61 sets the initial registration mode in response to the initial registration signal.

In the initial registration mode, the immobilizer ECU 6 writes the vehicle ID from the memory 67 to the electronic key 2 (step S3). In the present embodiment, the vehicle ID writer 62 transmits, the vehicle ID signal, which includes the vehicle ID (VID-A) stored in the memory 67 from the coil antenna 5 to the electronic key 2.

When receiving the vehicle ID signal, the electronic key 2 writes the vehicle ID to the memory 42 (step S4). In the present embodiment, the transponder 4 stores the vehicle ID (VID-A) in the memory 42. Subsequently, the electronic key 2 locks the vehicle ID (step S5). That is, the transponder 4 inhibits overwriting of the vehicle ID of the memory 42.

Following the writing of the vehicle ID, the immobilizer ECU 6 reads the SEED code from the electronic key 2 (step S6). In the present embodiment, the SEED reader 64 transmits the SEED request signal from the coil antenna 5 to request for the SEED code.

When receiving the SEED request signal, the electronic key 2 transmits the SEED signal (step S7). In the present embodiment, the transponder 4 transmits the SEED signal, which includes the SEED code (SC-1) stored in the memory 42.

The immobilizer ECU 6 calculates the encryption key (K-1) with the key generation logic f (step S8). In the present embodiment, the SEED reader 64 obtains the SEED code (SC-1) from the SEED signal. Then, the encryption key generation unit 65 generates the encryption key (K-1) with the key generation logic f, which uses the SEED code (SC-1). Therefore, the immobilizer ECU 6 does not directly obtain the encryption key (K-1) from the electronic key 2. The immobilizer ECU 6 obtains the SEED code (SC-1) to generate the encryption key (K-1).

The immobilizer ECU 6 stores the encryption key (K-1) in the memory 67 (step S9). In the present embodiment, the encryption key registration unit 66 stores, in the memory 67, the encryption key (K-1), which is generated with the encryption key generation unit 65. This completes registration of the encryption key (K-1) to the immobilizer ECU 6. The immobilizer ECU 6 performs immobilizer verification on the electronic key 2 using the registered encryption key (K-1).

The immobilizer ECU 6 updates the information of the database 9 (step S10). For example, the immobilizer ECU 6 transmits a database update signal to the registration tool 8. The database update signal includes the SEED code (SC-1), which is used to generate the encryption key (K-1) registered in the immobilizer ECU 6. When receiving the database update signal, the registration tool 8 updates the information of the database 9 through a network, which is not shown in the drawings (step S11).

Based on the database update signal, the database 9 stores the SEED code (SC-1) as information related to the encryption key (K-1) corresponding to the vehicle ID (VID-A).

The immobilizer ECU 6 transmits the SEED deletion request signal to the electronic key 2 (step S13). In response to the SEED deletion signal, the electronic key 2 deletes the SEED code (SC-1) from the memory 42. Subsequently, when detecting the initial registration denial operation (step S14), the immobilizer ECU 6 inhibits the use of the key generation logic f and denies subsequent initial registration (step S15). In the present embodiment, when the ignition switch is repeatedly switched on and off twenty times, the encryption key registration unit 66 determines that the initial registration denial operation has been performed. This inhibits the initial registration of the electronic key 2 to the immobilizer ECU 6.

Figure 5:
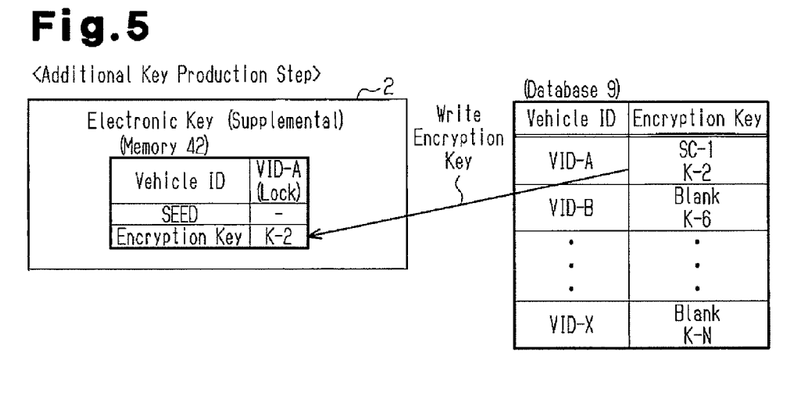
FIG. 5 is a diagram showing the production of an additional key of the electronic key registration system.

Additional registration of the electronic key 2 will now be described. As shown in FIG. 5, in an additional key production step, the vehicle ID (VID-A) of the vehicle 1 is written to the memory 42 of the electronic key 2 in accordance with an order sheet (order information). The additional registration encryption key (K-2), which corresponds to the vehicle ID (V-ID), is obtained from the database 9 and stored in the memory 42. This allows for the electronic key 2, which includes the vehicle ID (ID-A) and the encryption key (K-2), to be used for the immobilizer verification performed by the immobilizer ECU 6 without additionally registering the electronic key to the immobilizer ECU 6.

Figure 6:
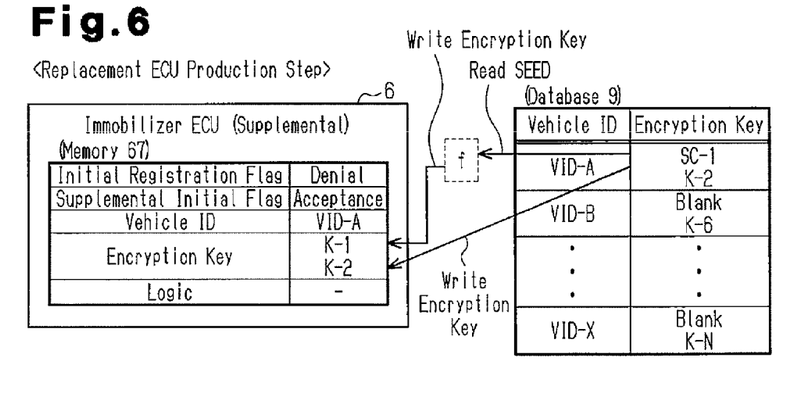
FIG. 6 is a diagram showing the production of a replacement ECU of the electronic key registration system.

Registration of the electronic key 2 when the immobilizer ECU 6 is replaced will now be described. As shown in FIG. 6, in a replacement controller production step (replacement ECU production step) in which the replacement immobilizer ECU 6 is produced, the vehicle ID (VID-A) of the vehicle 1 is written to the memory 67 of the immobilizer ECU 6 in accordance with the order sheet. The encryption key (K-2), which corresponds to the vehicle ID (V-ID), is obtained from the database 9 and stored in the memory 67. The SEED code (SC-1) is also obtained from the database 9. The SEED code (SC-1), which is stored in the database 9 and used to generate the encryption key (K-1) in the initial registration, serves as the encryption key information corresponding to the vehicle ID (VID-A). The encryption key (K-1) is generated with the key generation logic f, which uses the SEED code (SC-1), and stored in the memory 67 of the immobilizer ECU 6. In the memory 67, the initial registration flag is set to a denial state, which denies registration of the electronic key 2, and the supplemental initial registration flag is set to an acceptance state, which permits registration of the electronic key 2. The vehicle ID (VID-A) of the vehicle 1 and the encryption key (K-1) generated with the key generation logic f, which uses the SEED code (SC-1), are stored in the memory 42 of the initial production electronic key 2 that has been registered to the vehicle 1. Then, the registration tool 8 is connected to the vehicle 1 to perform a registration operation.

Figure 7:
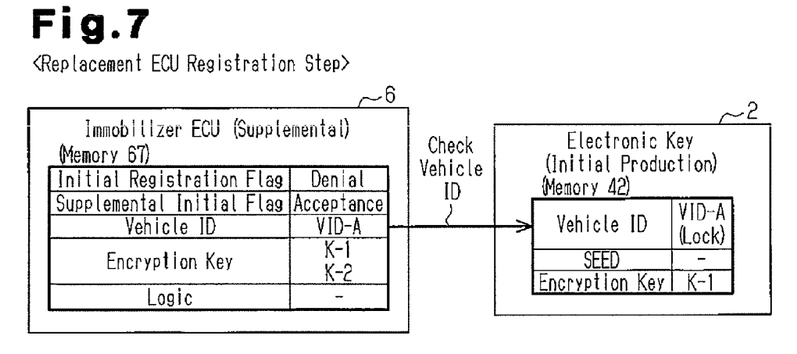
FIG. 7 is a diagram showing the registration of the replacement ECU of the electronic key registration system.

As shown in FIG. 7, in a replacement controller registration step (replacement ECU registration step), the immobilizer ECU 6 checks whether or not the vehicle ID, which is stored in the electronic key 2, is the same as the vehicle ID (VID-A) of the vehicle 1, in which the immobilizer ECU 6 is installed.

Figure 8:
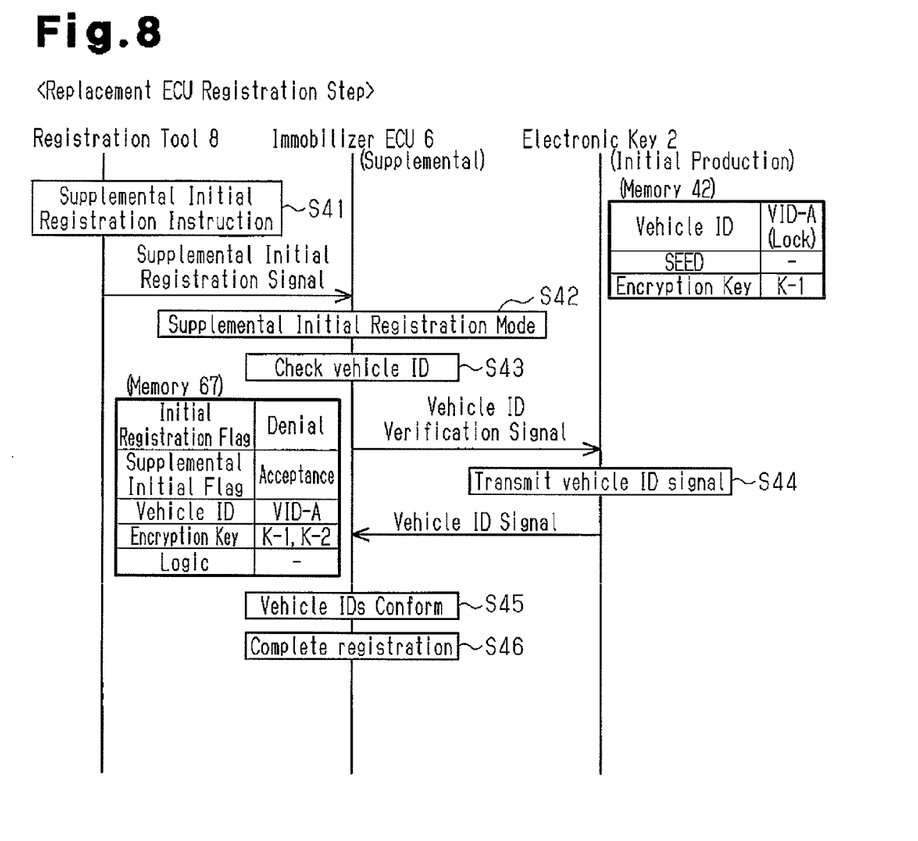
FIG. 8 is a sequence chart showing the registration operation when replacing an immobilizer ECU of the electronic key registration system.

More specifically, as shown in FIG. 8, in a replacement ECU registration step, when a user operates the operation unit 82 to select the supplemental initial registration, the registration tool 8 transmits the supplemental initial registration signal, which serves as a supplemental initial registration instruction, to the immobilizer ECU 6 (step S41). When receiving the supplemental initial registration signal, the immobilizer ECU 6 switches the operation mode to the supplemental initial registration mode (step S42). In the present embodiment, the mode switching unit 61 switches to the supplemental initial registration mode in which the electronic key 2 is registered to the replacement immobilizer ECU 6 for the first time.

Then, the immobilizer ECU 6 checks the vehicle ID, which is stored in the electronic key 2 (step S43). In the present embodiment, the vehicle ID checker 63 checks whether or not the vehicle ID, which is stored in the memory 67, is the same as the vehicle ID, which is stored in the electronic key 2, by transmitting the vehicle ID verification signal from the coil antenna 5 to the electronic key 2.

When receiving the vehicle ID verification signal, the electronic key 2 transmits the vehicle ID signal (step S44). In the present embodiment, the transponder 4 transmits the vehicle ID signal, which includes the vehicle ID (VID-A) stored in the memory 42.

The immobilizer ECU 6 (vehicle ID checker 63) checks whether or not the vehicle ID, which is received from the electronic key 2, conforms to the vehicle ID, which is stored in the memory 67. When the two vehicle IDs conform (step S45), registration of the electronic key 2 to the immobilizer ECU 6 is completed (step S46).

As described above, in the electronic key registration system 7, the immobilizer ECU 6 writes the vehicle ID (VID-A), which is registered in advance to the immobilizer ECU 6, to the electronic key 2 and obtains the SEED code (SC-1) from the electronic key 2. Then, the immobilizer ECU 6 generates the encryption key (K-1) with the key generation logic f, which uses the SEED code (SC-1), and stores the encryption key (K-1) in the immobilizer ECU 6. Therefore, prior to the initial registration, the vehicle ID (VID-A) is not stored in the electronic key 2. Also, prior to the initial registration, the encryption key (K-1) is not stored in the immobilizer ECU 6. This eliminates the need to ship the electronic key 2 and the immobilizer ECU 6 together. The vehicle ID (VID-A) is stored in the electronic key 2 after the initial registration. This inhibits registration of the electronic key 2 to another immobilizer ECU 6 subsequent to the initial registration.

After the initial registration of the electronic key 2, the SEED code (SC-1), which is used to generate the encryption key (K-1 ), is stored in the database 9, and the SEED code (SC-1) is deleted from the electronic key 2. The SEED code (SC-1) no longer exists in the electronic key 2. This inhibits registration of the initial registration electronic key 2 to another immobilizer ECU 6. Accordingly, the security level is improved. When replacing the immobilizer ECU 6 in the same vehicle 1, the SEED code (SC-1) is extracted from the database 9, and the encryption key (K-1) is generated with the key generation logic f, which uses the SEED code (SC-1), and stored in the memory 67. This allows for easy registration of the initial registration electronic key 2 to the replacement immobilizer ECU 6. Additionally, the vehicle ID (VID-A), which is in accordance with an order sheet, is written in the additional registration electronic key 2, and the encryption key (K-2) is stored in the additional registration electronic key 2 from the database 9. This eliminates the need for the extraction of the SEED code and the generation of the encryption key when registering the additional registration electronic key 2 to the electronic key 2. Thus, additional registration of the electronic key 2 is facilitated while ensuring security.

The present embodiment has the advantages described below.

(1) In the initial production step, the immobilizer ECU 6 includes the vehicle ID (VID-A), which is unique to the vehicle 1, but does not include the encryption key (K-1)

corresponding to the initial registration electronic key 2. The initial registration electronic key 2 includes the SEED code (SC-1) and the encryption key (K-1) but does not include the vehicle ID (VID-A). The data stored in the electronic key 2 is not the same as that stored in the immobilizer ECU 6. This eliminates the need to ship the electronic key 2 and the immobilizer ECU 6 together. In the initial registration step, the vehicle ID (VID-A) is stored in the electronic key 2 from the immobilizer ECU 6. Also, the SEED code (SC-1) is obtained from the electronic key 2, and the encryption key (K-1) is generated with the encryption key generation logic f, which uses the SEED code (SC-1), and stored in the immobilizer ECU 6. Therefore, the electronic key 2 corresponds only to the immobilizer ECU 6 including the vehicle ID (VID-A) and the encryption key (K-1), that is, the electronic key 2 does not correspond to the immobilizer ECU of another vehicle. Subsequent to the initial registration, the SEED code (SC-1) is stored in the database 9 as encryption key information related to the encryption key (K-1), which is stored in the immobilizer ECU 6. When producing the replacement immobilizer ECU 6, the encryption key (K-1) is generated from the SEED code (SC-1), which is stored in the database 9. This allows for registration of the electronic key 2, which includes the encryption key (K-1), to the replacement immobilizer ECU 6. This method restricts registration of the initial registration electronic key 2 to the immobilizer ECU of another vehicle. This allows for easy registration of the electronic key 2 while ensuring security and eliminating the need to ship the electronic key 2 and the immobilizer ECU 6 together.

(2) In the initial registration step, the SEED code (SC-1) of the initial registration electronic key 2 is deleted. Thus, the encryption key K would not be generated even when an attempt is made to register the initial registration electronic key 2 to the immobilizer ECU of another vehicle. This restricts registration of the initial registration electronic key 2 to the immobilizer ECU of another vehicle.

(3) In the initial production step, the encryption key (K-2) of the electronic key 2 that is additionally registered is stored in advance in the immobilizer ECU 6. Also, in the additional key production step, the vehicle ID (VID-A) is stored in the additional registration electronic key 2, and the encryption key (K-2) from the database 9 is also stored in the electronic key 2. When the electronic key 2 is additionally registered, the immobilizer ECU 6 may verify the electronic key 2 without directly obtaining the encryption key (K-2) from the electronic key 2. This restricts registration of the additional registration electronic key 2 to the immobilizer ECU of another vehicle and facilitates additional registration while ensuring security.

(4) In the replacement ECU production step, the encryption keys (K-1, K-2) are obtained based on information of the database 9 and stored in the replacement ECU 6. In the replacement ECU registration step, the replacement immobilizer ECU 6 checks that the vehicle ID (VID-A) is written in the electronic key 2. This eliminates the need to exchange the encryption keys (K-1, K-2) between the immobilizer ECU 6 and the electronic key 2 and restricts registration of the electronic key 2 that does not store the vehicle ID (VID-A) to the immobilizer ECU 6.

(5) The use of the key generation logic f is inhibited after the initial registration electronic key 2 is registered. This inhibits another electronic key, which uses the same encryption key as that of the initial registration electronic key 2, to be newly registered to the immobilizer ECU 6.

(6) The vehicle ID (VID-A) is stored in the replacement immobilizer ECU 6 and the electronic key 2 when shipped from the factory. This inhibits registration of the electronic key 2 to the immobilizer ECU 6, which differs from the order, and registration of the electronic key 2, which differs from the order, to the immobilizer ECU 6 after being circulated in the market.

The above embodiment may be modified as follows.

In the above embodiment, the use of the key generation logic f is inhibited subsequent to the initial registration. Instead, the key generation logic f may be deleted.

In the above embodiment, the use of the key generation logic f is inhibited subsequent to the initial registration. However, the key generation logic f may be used subsequent to the initial registration.

In the initial registration step of the above embodiment, the SEED code is deleted from the memory 42 subsequent to the initial registration. However, the SEED code does not have to be deleted if there is no possibility of the SEED code being obtained to generate the encryption key.

In the initial registration step and the additional key registration step of the above embodiment, the encryption key may be registered after the challenge response verification is performed.

In the above embodiment, subsequent to the initial registration, the SEED code (SC-1) is stored in the database 9 as encryption key information related to the encryption key (K-1), which is registered in the immobilizer ECU 6. Instead, the encryption key (K-1) may be stored in the database 9 as the encryption key information. This omits calculation with the key generation logic f when the encryption key K is stored in the replacement immobilizer ECU 6 from the database 9.

In the above embodiment, the vehicle ID is shown on the display 15 of the vehicle 1 when obtaining the vehicle ID. Instead, when the vehicle 1 undergoes a specific operation that requests for the vehicle ID, the vehicle ID may be transmitted to a mail address that a user specifies. This allows only for the user to receive the mail and check the vehicle ID and ensures high confidentiality.

In the above embodiment, the operation of the ignition switch 14 is specified as the initial registration denial operation. However, another operation may be set in lieu of the operation of the ignition switch 14.

In the above embodiment, the present invention is applied to the immobilizer system 3, in which the electronic key 2 is inserted in the key cylinder. Instead, the present invention may be applied to an electronic key system that allows for communication when the electronic key enters a communication area generated by the vehicle 1.

In the above embodiment, the present invention is applied to the electronic key system of the vehicle 1. Instead, the present invention may be applied to an electronic key system of a building such as a house.

The invention claimed is:

1. An electronic key registration method for registering a first electronic key, which is capable of controlling a vehicle, to a controller of the vehicle, the electronic key registration method comprising:
  performing an initial production process including
    storing identification information unique to the vehicle in the controller, and
    storing, in the first electronic key, an encryption key generation code unique to the first electronic key and an encryption key that is used to verify the first electronic key; and
  performing an initial registration process including
    writing the identification information stored in the controller to the first electronic key, obtaining the encryption key generation code from the first electronic key, generating the encryption key with an encryption key generation logic that uses the encryption key generation code, registering the first electronic key to the controller by storing the encryption key in the controller, storing encryption key information related to the encryption key in a database in association with the identification information, and after the registering the first electronic key to the controller, deleting the encryption key generation code from the first electronic key.

2. The electronic key registration method according to claim 1, wherein the performing an initial production process further includes storing, in the controller, an encryption key that is used to verify a second electronic key that is additionally registered, the electronic key registration method further comprises performing an additional key production process including storing, in the second electronic key, the identification information and the encryption key of the second electronic key, which is stored in the database in association with the identification information.

3. The electronic key registration method according to claim 1, further comprising:

performing a replacement controller production process including reading the encryption key information from the database and storing the encryption key of the first electronic key and the identification information in a newly replaced controller; and performing a replacement controller registration process including checking that the identification information, which is stored in the replaced controller, is registered to the first electronic key.

4. The electronic key registration method according to claim 1, further comprising inhibiting the use of the encryption key generation logic after the encryption key generation logic is used.

5. The electronic key registration method according to claim 2, further comprising based on order information generated by checking the identification information that is set in advance for the vehicle, storing identification information, which differs for each vehicle, in a replacement controller and the second electronic key prior to shipment.

6. An electronic key registration system comprising:

a controller located in a vehicle, wherein the controller is configured to store identification information unique to the vehicle; and an electronic key capable of controlling the vehicle, wherein the electronic key is configured to store an encryption key generation code and an encryption key, wherein the controller is configured to write the identification information to the electronic key, obtain the encryption key generation code from the electronic key, calculate the encryption key with an encryption key generation logic that uses the encryption key generation code, and store encryption key information related to the encryption key in a database in association with the identification information, the controller includes a memory that stores the encryption key, and after the controller completes registration of the electronic key by storing the encryption key in the memory, the controller requests the electronic key to delete the encryption key generation code from the electronic key.

* * * * *